UNITED STATES PATENT OFFICE.

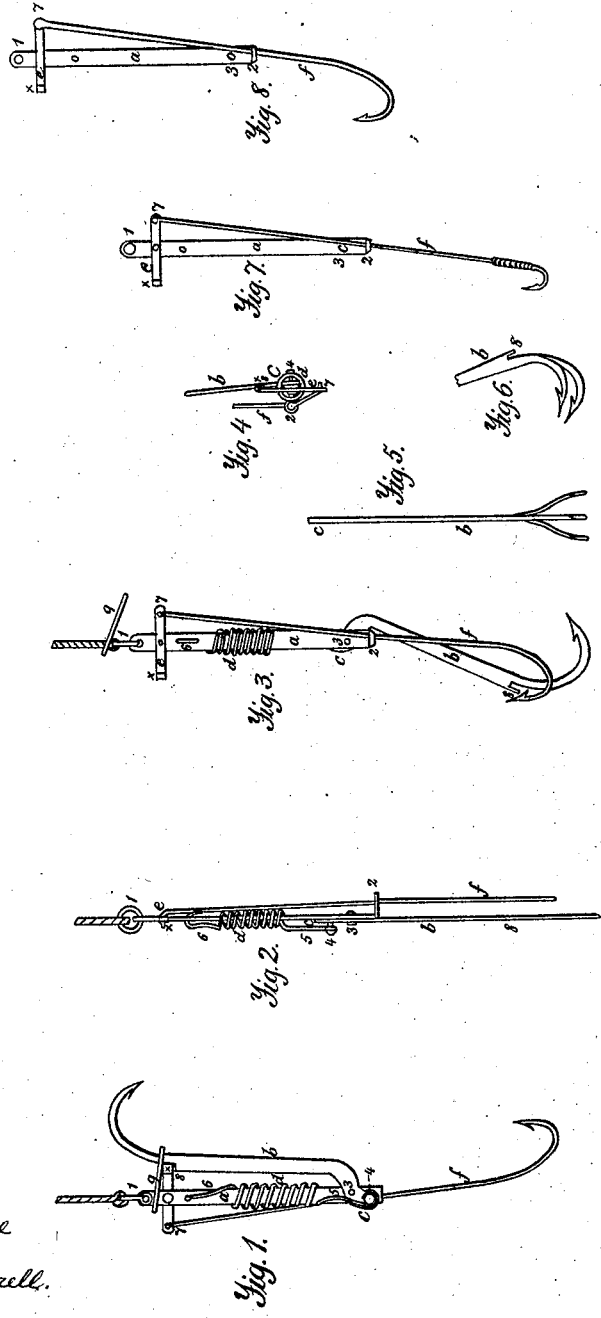

JOB JOHNSON, OF BROOKLYN, NEW YORK.

IMPROVEMENT IN FISH-HOOKS.

Specification forming part of Letters Patent No. 5,256, dated August 21, 1847.

*To all whom it may concern:*

Be it known that I, JOB JOHNSON, of the city of Brooklyn, State of New York, fish-hook manufacturer, a native of England, having been resident more than one year next preceding the date hereof in the United States, and having duly declared my intention to become a citizen thereof, have invented and made and applied to use certain new and useful improvements in the constructive application, arrangement, and combination of mechanical means whereby the bite of a fish at the bait on a hook causes a crooked barb-dart to strike into and hold the nose, head, or gills of the fish, independently both of the line and of the person holding the line, and the general arrangement of which, when of a proper size, may be applied to the capture of any kind of fish or of any destructive or ferocious animal, and for which improvements I seek Letters Patent of the United States; and I do hereby declare that the said improvements are constructively and substantially set forth and shown, with their use, operation, and effect, in the following description, and in the drawings annexed to and making a part of this specification, wherein—

Figure 1 shows a small or moderate sized apparatus with the parts employed as in place for use, as on one side. Fig. 2 is the same, but with the dart discharged, as at right angles to Fig. 1. Fig. 3 is the same seen on the opposite side to Fig. 1, and Fig. 4 is a plan of the parts as seen from the top.

The other figures are separately referred to, and the same letters and numbers, as marks of reference, apply to the like parts in all the several figures.

*a* is a stock or frame piece, with a hole and ring, 1, at top for the line, the lower end turned up, as at 2, with a hole through it. At 3 is a rivet, forming a fulcrum-joint for a crooked and barbed dart, *b*, made with one, two, or three tines or points. (See the conjoint Figs. 5 and 6.) The other end of the barb *b* forms a crank-arm, *c*, having a headed stud, 4, which takes a hook on the leader 5 of the contractile helical spring *d*. This is placed around the body of the stock *a*, with a tail-piece, 6, hooked through a hole above. Between this and the hole 1 is a small trigger-beam or lever, *e*, held by a rivet on *a*, with a hole, 7, at one end, that receives a loop on the top of the changeable hook *f*. This is shown as a common fish-hook with an elongated shank, the top or loop of which is to be held on the beam *e* by woolding on a small string, or may be a small hook and gut, as shown in the detached Fig. 7, and attached to the beam *e*; or the hook may be riveted to the beam, as shown in Fig. 8. In any case the shank or gut is to be put through the hole in the lip at 2. At the back of the dart *b* is a small cock-pin, 8, which, when the dart is ready for use, enters a hole, *. On the opposite end of the beam *e*, and at right angles to the hole 7, as shown in Figs. 1, 2, 3, 4, 7, and 8, the guard-ring 9, above the beam *e*, travels on the line when not needed to hold the barb-dart, as in Fig. 1, to protect the user from injury by the dart accidentally discharging while setting the bait for use, after which the ring is to be removed from the dart.

By the constructive application, arrangement, combination, and adjustment of these parts the slightest pull of the fish or any animal at the bait on the hook *f* draws down the end at 7 of the trigger *e*, and, raising the opposite end, lets go the pin 8 on the dart *b*. The contractile power of the spring *d*, acting through the crank-arm *c*, instantly projects the barbed point of the dart *b*, by a semicircular movement, into the fish or animal, without any action of the line or the person holding the line, with an almost unerring certainty of holding fast in some part of the head or part that touches the bait, and the edge only of the dart being resisted by the water cuts through that without materially lessening the force of the blow; and where two or more points are used they act like a grapnel, and no struggles of the stricken fish or animal can disengage them except by tearing out the part stricken into.

I do not claim to have invented the common fish-hook, as that is well known and in general use; but I do claim as new and of my own invention and desire to secure by Letters Patent of the United States—

1. The original application of the stock or frame piece *a*, the original application of the helical contractile spring *d*, together with the original constructive arrangement of these parts for these purposes, conjointly with a crooked and barbed dart, b, acting, through the cock-pin 8, trigger-lever e, and contractile helical spring d, to strike the fish or animal by disengaging the dart b from the trigger d through the combined action of the changeable hook f with and upon the foregoing parts, the whole constructively arranged and combined to strike the fish or animal with the dart b at the instant of the fish or animal biting at or touching the bait on the hook f, the whole effected without any action of the line or of the person holding the line, substantially as described and shown.

2. The application of the guard-ring 9, to protect the user from injury by the dart accidentally disengaging while setting the bait for use.

In witness whereof I have hereunto set my hand in the city of New York this 31st day of March, 1847.

JOB JOHNSON.

Witnesses:
   W. SERRELL,
   LEMUEL W. SERRELL.